United States Patent [19]

Volkov et al.

[11] 4,054,243
[45] Oct. 18, 1977

[54] PREPARATION-MAKING ULTRACENTRIFUGE

[76] Inventors: Gennady Ivanovich Volkov, ulitsa Borskaya, 17, kv. 2; Vladilen Mikhailovich Denisov, ulitsa Avtomobilnaya, 16, kv. 13; Anatoly Efimovich Ermishin, prospekt Kirova, 43a, kv. 42; Jury Petrovich Zaozersky, pereulok Rulevoi, 7, kv. 36; Vladimir Veniaminovich Zozin, ulitsa Komsomolskaya, 2, kv. 14,, all of Gorky; Viktor Pavlovich Kapitonov, ulitsa Marshala Birjuzova, 40, kv. 90, Moscow; Isaak Kushelevich Kikoin, ulitsa peschanaya, 10, kv. 14, Moscow; Vladimir Alexandrovich Lebedev, ulitsa Gamalie, 2, kv. 41, Moscow; Nikolai Markovich Lystsov, ulitsa Rogova, 4, Kottedzh 11, kv. 2, Moscow; Leonid Ivanovich Matveev, ulitsa Rogova, 3, kv. 132, Moscow; Timofei Vasilievich Popov, ulitsa Vatutina, 4, kv. 14, Gorky; Vasily Andreevich Ryabov, Avtomekhanicheskaya ulitsa 14, kv. 4, Gorky; Albert Grigorievich Sukhov, ulitsa Uritskogo, 12, kv. 9, Gorky; Vitaly Mikhailovich Sysoev, ulitsa Krasnodontsev, 9a, kv. 1, Gorky; Alexandr Alexeevich Shishin, ulitsa Starykh proizvodstvennikov, 6, kv. 52, Gorky; Nikolai Mikhailovich Shatalin, ulitsa Vatutina, 2, kv. 3, Gorky; Stanislav Alexeevich Shesterikov, Frunzenskaya naberezhnaya, 26, kv. 55, Moscow, all of U.S.S.R.; Sergei Petrovich Martynov, deceased, late of Gorky, U.S.S.R.; by Nina Fedorovna Martynova, administrator, ulitsa Komsomolskaya, 11, kv. 22, Gorky, U.S.S.R.; by Olga Sergeevna Martynova, administrator, ulitsa Komsomolskaya, 11, kv. 22, Gorky, U.S.S.R.; Alexandr Sergeevich Martynov, ulitsa Komsomolskaya, 11, kv. 22, Gorky, U.S.S.R.

[21] Appl. No.: 632,774
[22] Filed: Nov. 17, 1975

Related U.S. Application Data

[63] Continuation of Ser. No. 513,133, Oct. 8, 1974, abandoned.

[51] Int. Cl.$^2$ .................... B04B 9/02; B04B 15/02
[52] U.S. Cl. .................................. 233/11; 233/24; 233/26
[58] Field of Search .......... 233/1 R, 1 A, 11, DIG. 1, 233/23 R, 23 A, 24, 26; 310/166, 266, 171; 308/10

[56] References Cited

U.S. PATENT DOCUMENTS

| | | | |
|---|---|---|---|
| 2,372,983 | 4/1945 | Richardson | 233/1 R |
| 2,738,433 | 3/1956 | Schroeder et al. | 310/266 X |
| 2,917,229 | 12/1959 | Di Benedetto et al. | 233/11 |
| 2,929,946 | 3/1960 | Aske | 310/166 |
| 3,216,226 | 11/1965 | Alger et al. | 310/266 X |
| 3,216,655 | 11/1965 | Wind et al. | 233/DIG. 1 |
| 3,347,453 | 10/1967 | Goergen | 233/11 |
| 3,377,021 | 4/1968 | Fox et al. | 233/26 |
| 3,850,368 | 11/1974 | Boeckeler | 233/26 |

Primary Examiner—George H. Krizmanich
Attorney, Agent, or Firm—Holman & Stern

[57] ABSTRACT

A preparation-making ultracentrifuge is disclosed comprising a magnetic suspension and an electric motor, which are disposed within its casing, said magnetic suspension consisting of a permanent magnet with a magnetic circuit, the armature of said electric motor being made in the form of a sleeve fixedly secured to the centrifuge rotor is disclosed. Such construction of a preparation-making ultracentrifuge enables the rotor to be accelerated to the required speed within a comparatively short time period and allows a reduction in the weight of the electric motor armature.

8 Claims, 9 Drawing Figures

PREPARATION-MAKING ULTRACENTRIFUGE

This is a continuation of application Ser. No. 513,133 filed Oct. 8, 1974, now abandoned.

BACKGROUND OF THE INVENTION

The present invention relates to laboratory equipment used for research mainly in the field of biology, and more particularly, to preparation-making ultracentrifuges.

The invention can be used in molecular biology, biochemistry, virology, medicine and other scientific fields for investigation of proteins, nucleic acids, for separation and concentration of viruses and in all other applications where substances of different densities in a liquid phase have to be separated in powerful centrifugal fields.

There exists a high-speed gas centrifuge used in such types of research work for separation of gaseous substances; this centrifuge comprises an evacuated housing which contains a thin-walled hollow rotor of cylindrical shape, which is driven by an electric motor disposed within the centrifuge housing. A magnetic suspension is provided to hold the rotor in a vertical position, said magnetic suspension being arranged within the centrifuge housing above the rotor. The magnetic suspension comprises a cylindrical permanent magnet and an armature secured to the upper cover of the rotor. Attached to the lower cover of the rotor is a flexible spindle by means of which the rotor rests on a hydraulically damped step bearing mounted in the rotor support. The electric motor uses a butt-type stator and a disc-shaped armature mounted on the lower cover of the rotor. The centrifuge is provided with several tubes to feed gas into the rotor and obtain the fractions. The gas centrifuge functions as follows. The electric motor, which operates as an asynchronous machine, accelerates the rotor to the required speed and then maintains this speed constant.

A gas is fed into the rotor through one of the tubes, fills the rotor and then spins together with it. After the required centrifugation time the gas fractions are removed. The rotor can be filled with gas and fractions can be obtained continuously with the centrifuge running. In view of this, no limitations are placed on the time required to accelerate the rotor to the required speed. The centrifuge does not have to meet any special requirements with regard to temperature during this operation. Partially because it is designed to operate continuously and has no apparatus for temperature control the gas centrifuge cannot be used as a preparation centrifuge by merely replacing its rotor. The design of the electric motor and of the magnetic suspension of the rotor in the gas centrifuge are largely determined by the specific design features of the rotor. The relatively small weight of the rotor makes it possible to use a permanent magnet in the magnetic suspension. The flat face of this permanent magnet is disposed above the cylindrical rotor and produces a sufficient lift for the given type of rotor without the need of any additional controllable magnetic circuit. One of the conditions on which normal operation of a thin-walled rotor of the gas centrifuge depends is the presence of low masses at the rotor ends. This condition necessitates the use of a butt-type stator in the electric motor, the armature thereof being in the form of a disc which can be mounted directly on the rotor. The rotor of a preparation centrifuge is much heavier and has different inertia parameters. Therefore without an additional magnetic circuit in the rotor magnetic suspension of the gas centrifuge it is not possible to obtain the required combination of a vertical and horizontal rigidity of the magnetic coupling required for the dynamic stability of a preparation rotor and for its reliable operation. An increase in the vertical rigidity can be obtained if the lift produced by the magnetic suspension is increased by moving its armature closer to the permanent magnet but this makes the armature liable to stick to the magnet during operation and may result in a breakdown.

In a preparation-making centrifuge the time during which the rotor has to be accelerated and braked, is, as a rule, limited to within 30 minutes.

The electric motor used in the gas centrifuge cannot accelerate the rotor to the required speed within such a short period of time as the torque it develops is rather low. The power of the electric motor cannot be increased by merely increasing its size as the increased attraction of the disc-shaped armature to the stator overloads the rotor support beyond permissible limits.

There exists a preparation-making ultracentrifuge comprising an evacuated housing which contains a vertically mounted rotor surrounded by a temperature-regulating shell and adapted for accommodation of vessels with preparations, said rotor being disposed coaxially with and below a magnetic suspension and above a rotor drive and a rotor support.

The magnetic suspension of the existing preparation-making centrifuge is disposed outside the centrifuge housing and comprises a solenoid which holds the rotor in a vertical position and consists of three sections separated from one another by brass sheets cooled by copper coils through which water is passed. Mounted inside the solenoid is a core suspended from a piano wire. The lower part of the core is located in an oil bath.

In the existing preparation-making centrifuge the conical upper end of the rotor is located within the magnetic field of the core.

The centrifuge includes an electronic servo system which holds the rotor in a vertical position by adjusting the current through the solenoid. The rotor is driven by an air turbine, the turbine drive being disposed outside the centrifuge housing. Rotation of the turbine is imparted to the rotor by means of a flexible steel shaft, passing through a vacuum seal, and a connecting stud which engages a slot made in the lower part of the rotor. When the rotor is accelerated to the required speed, the flexible shaft is disengaged from the rotor by means of a lever specially provided for the purpose. A neoprene washer mounted at the connecting stud base keeps the centrifuge housing airtight when the connecting stud moves down. The rotor of the centrifuge spins freely due to inertia when the pressure inside the centrifuge housing is about $10^{-6}$ mm Hg.

Horizontal oscillations of the rotor which often appear during operation cause displacements of the solenoid with the core, which are damped in the oil bath.

Separation of the liquid during operation of the centrifuge is monitored through a window provided in the centrifuge housing.

The existing construction of a preparation ultracentrifuge has a number of disadvantages, one of which being that the rotor drive is disposed outside the centrifuge housing. This requires the provision of vacuum seals on the shaft. The fact that the drive has to be disengaged after acceleration of the rotor makes it possible to maintain a constant rotation speed of the rotor for a long time and therefore limits the time of the experiment. The presence of vacuum seals on the rotating flexible shaft of the rotor reduces the reliability and operating life of the centrifuge. The operational reliability of the electronic servo system which serves for vertical stabilization of the rotor is not high enough.

Still another disadvantage of the existing ultra centrifuge is that the pressure within the centrifuge housing has to be maintained at about $10^{-6}$ mm Hg in order that the rotor can spin due to inertia for a long time without an appreciable drop in its speed. This necessitates the use of special vacuum pumps and seals.

OBJECTS AND SUMMARY OF THE INVENTION

The object of the invention is to provide a preparation-making ultracentrifuge wherein the rotor drive and the magnetic suspension of the rotor accelerate the rotor to the required speed within a comparatively short period of time and thereupon maintain this speed for unlimited time periods.

This object is accomplished by a preparation-making ultracentrifuge comprising an evacuated housing which contains a vertically mounted rotor surrounded by a temperature-regulating shell and adapted for accommodation of vessels with preparation; said rotor being disposed coaxially with and below a magnetic suspension and above a rotor drive and a rotor support. According to the invention, the rotor drive is an electric motor whose armature is made in the form of a sleeve, being fixedly secured to the rotor while the magnetic suspension is disposed within the evacuated housing and comprises an annular permanent magnet with an additional magnetic circuit.

The fact that the rotor drive is disposed within the centrifuge housing enables the vacuum seals to be disposed of. The magnetic suspension with the magnetic circuit provides sufficient vertical rigidity of the magnetic coupling for the preparation rotor and permits the rotor to be vertically stabilized without the use of an electronic servo system.

Preferably the armature of the electric motor is a sleeve with double-layer walls wherein one layer is made from a ferro-magnetic material and the other layer from a non-magnetic electrically conductive material. This enables a high torque to be obtained with a comparatively small weight of the armature.

In one embodiment of the invention the stator of the electric motor is disposed within the evacuated housing of the centrifuge and is fixedly secured to the temperature-regulating shell.

With such arrangement of the centrifuge, the temperature-regulating shell can be mounted at a minimum distance from the rotor, which facilitates the maintenance of the required rotor temperature during operation.

In another embodiment of the invention a heat insulator is interposed between and fixedly secured to the electric motor armature and the centrifuge rotor to prevent transfer of heat to the rotor during operation of the electric motor.

In still another embodiment of the invention the magnetic circuit of the magnetic suspension is made in the form of a bushing which is disposed concentrically with the permanent magnet with a support member adjoining the bushing perpendicularly to its shaft, so that a gap is provided between the bushing. The magnet and the size of the gap and the length of the bushing are dependent on the required lifting pull produced by the magnetic suspension.

In yet another embodiment of the invention the rotor has a number of blades which are disposed equidistantly along its circumference and are fixedly secured to the rotor, each blade being provided with a slot disposed radically with respect to the rotor to accommodate cylindrical vessels with the preparation. These vessels are mounted so that they are capable of turning on pins fixedly secured in the rotor perpendicularly to the axis of the vessel.

Such construction of a preparation rotor is used in a number of experiments where the preparation has to be placed in a turning vessel so as to avoid the mixing of the preparation being centrifuged when the rotor is being slowed or comes to a stop.

In the next embodiment of the invention each of the rotor blades is made from an anisotropic material which has a maximum strenght in the direction of the rotor radius; said blades being fixedly secured to the central part of the rotor. This permits a reduction in the rotor weight and, consequently, in the pressure it exerts on a step bearing mounted in the rotor support.

Preferably the walls of the vessel for the preparation must be such that their thickness uniformly increases towards its bottom so that they are uniformly strong.

BRIEF DESCRIPTION OF THE DRAWINGS

The invention will be better understood from the following detailed description of its embodiments when read in connection with the accompanying drawings in which.

DETAILED DESCRIPTION OF THE INVENTION

The preparation-making ultracentrifuge has a housing 1 (FIG. 1) containing a vertically mounted rotor 2. A magnetic suspension 3 which is fixedly secured in the housing 1 is disposed coaxially with and below the rotor 2. An electric motor 4 is also disposed coaxially with and below the rotor 2 in the housing 1. The rotor 2 has a support spindle 5 which rests on a support 6 mounted within the housing 1. A protective cylindrical member 7 is mounted within the housing 1 between the housing wall and the rotor 2 to protect the housing 1 and environs should the rotor 2 break during rotation. Disposed between the protective cylindrical member 7 and the rotor 2 is a thin-walled temperature regulating shell 8 which surrounds the rotor 2 so as to maintain the required temperature of the rotor 2 during operation of the centrifuge. The rotor temperature is measured by means of a temperature pick-up 9. Mounted on the outer surface of the shell 8 is a coil 10 of the cooling unit evaporator (not shown).

Figure 1:
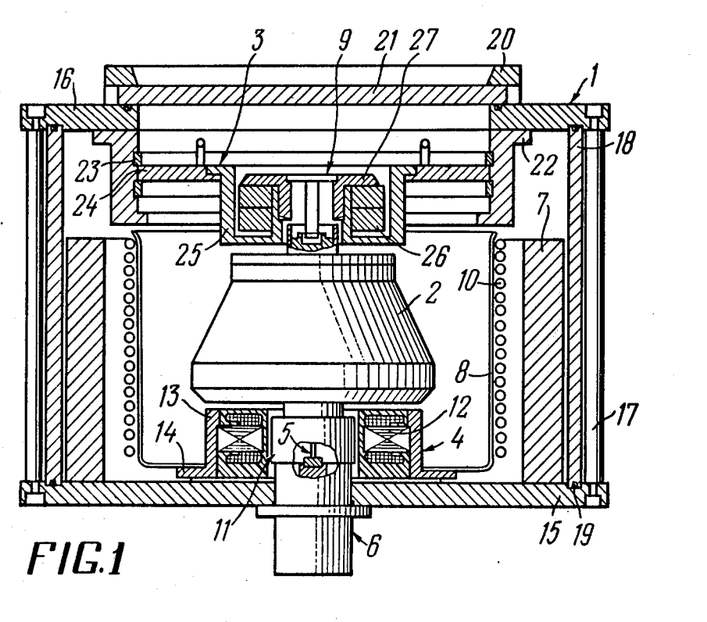
FIG. 1 is a view showing an axial vertical section of a preparation-making ultracentrifuge, according to the invention.

The electric motor 4 which drives the rotor 2 is disposed within the housing 1 and coaxially with the rotor. According to the invention, an armature 11 of the electric motor 4 is fixedly secured to the rotor 2. A stator 12 of the electric motor 4 has a circular shape and comprises a magnetic circuit, which is assembled of iron sheets, and a three-phase winding. The stator 12 is accommodated in a cylindrical frame 13 and is potted in an epoxy compound. The frame 13 has a flange 14 for attachment to the housing 1. Secured to the flange 14 is the temperature-regulating shell 8. The housing 1 is formed by a lower rectangular plate 15 and an upper rectangular plate 16 and a cylinder 18 which is clamped between the plates by means of bracing rods 17 with rubber vacuum seals 19.

The upper plate 16 of the housing 1 has an opening through which the rotor 2 and the magnetic suspension 3 are mounted in the housing 1. Guides 20 on the plate 16 hold a cover 21 which closes the opening in the upper plate 16. The cover 21 is mounted on three ball bearings (not shown) and is rolled aside when opened. Mounted inside the housing 1 is a sleeve 22 which is attached to the upper plate 16, the inner surface of the sleeve being provided with circular grooves for split support rings 23 which are used for mounting a flange 24 for attachment of the magnetic suspension 3; the required support ring being selected depending on the type of the rotor 2. Mounted on the bearing surface of each ring 23 are micro-switches (not shown) which are used for closing the rotation control circuit of the rotor 2, included in the centrifuge control system. Each circuit controlling the rotation of the rotor 2 is used to set the maximum speed of the rotor 2 depending on its type.

Attached to the flange 24 (FIG. 2) which has a triangular shape, is a cup 25 the bottom of which has a hole and a circular projection facing inside the cup 25 and used for centering an annular permanent magnet 26 mounted in the cup 25 of the magnetic suspension 3. The permanent magnet 26 is magnetized in the direction of the magnet ring axis and is made from a material with a high coercive force. The upper side (in the drawing) of the annular magnet 26 adjoins a magnetic support 27 made from a soft magnetic material. The magnetic support 27 is a bushing with an adjacent support member facing said upper side of the magnet 26. The bushing of the magnetic support 27 which is accommodated in the hole of the magnet 26 is separated from the magnet by a gap, the size of the gap and the length of the bushing being selected in inverse proportion to the required lifting pull of the magnetic suspension 3. The support 27 has holes for attachment of the magnetic support to the circular projection of the cup 25 by means of screws 28. A cylindrical member 29 having a through hole is screwed into the bushing of the magnetic support 27 to accommodate a thermistor 30 fixedly secured to a holder 31 which is mounted in the cylindrical member 29 by means of screws 32. Leads 33 of the thermistor 30 are accommodated in insulation bushings 34 mounted in the flange 24. The same flange 24 has a hole with a cover 35 to provide access to the leads 33 of the thermistor 30. The thermistor 30 serves as a non-contact pick-up sensing the temperature of the rotor 2.

Figure 2:
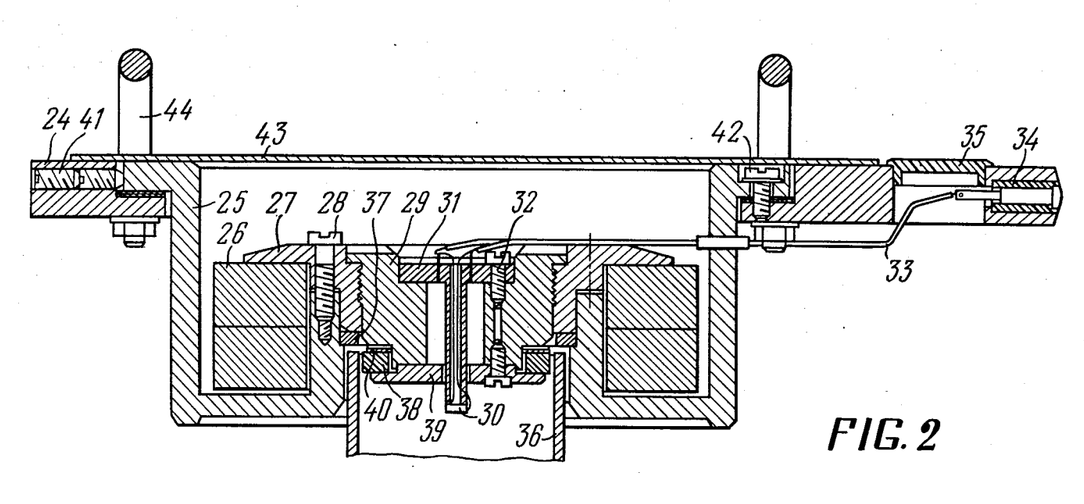
FIG. 2 is a cross-sectional view of the magnetic suspension of the rotor.

The magnetic suspension 3 has an armature 36 in the form of a sleeve made from a ferromagnetic material, part of the sleeve being accommodated in the hole of the angular magnet 26. To prevent sticking of the armature 36 to the lower end (in the drawing) of the magnetic support 27 a non-magnetic ring 37 is mounted in a groove made in the circular projection of the cup 25.

The material of the magnet 26, the degree of its magnetization as well as the size and the mutual arrangement of the magnetic support 27 and the armature 36 are selected depending on the type of the rotor 2.

As the armature 36 is fixedly secured to the rotor 2, a ring 38 made from some non-magnetic anti-friction material, such as teflon, is provided to ensure that the armature 36 moves clear of the cylindrical member 29 during rotation of the rotor 2. The ring 38 is mounted in the recess made in the lower end (in the drawing) of the cylindrical member 29 and is attached to the cylindrical member by means of a washer 39 and a ring spring 40.

The magnetic suspension 3 is centered by means of screws 41; the axes thereof being perpendicular to the axis of the annular magnet 26. The holes receiving the screws 41 are equi-distantly disposed along the circumference of the flange 24. In the given case, use is made of three screws 41. After centering, the magnetic suspension 3 is secured to the flange 24 by means of screws 42. The magnetic suspension 3 is provided with a protective cover 43 and handles 44 are attached to the flange 24 for mounting the magnetic suspension in the housing 1.

Figures 3, 4:
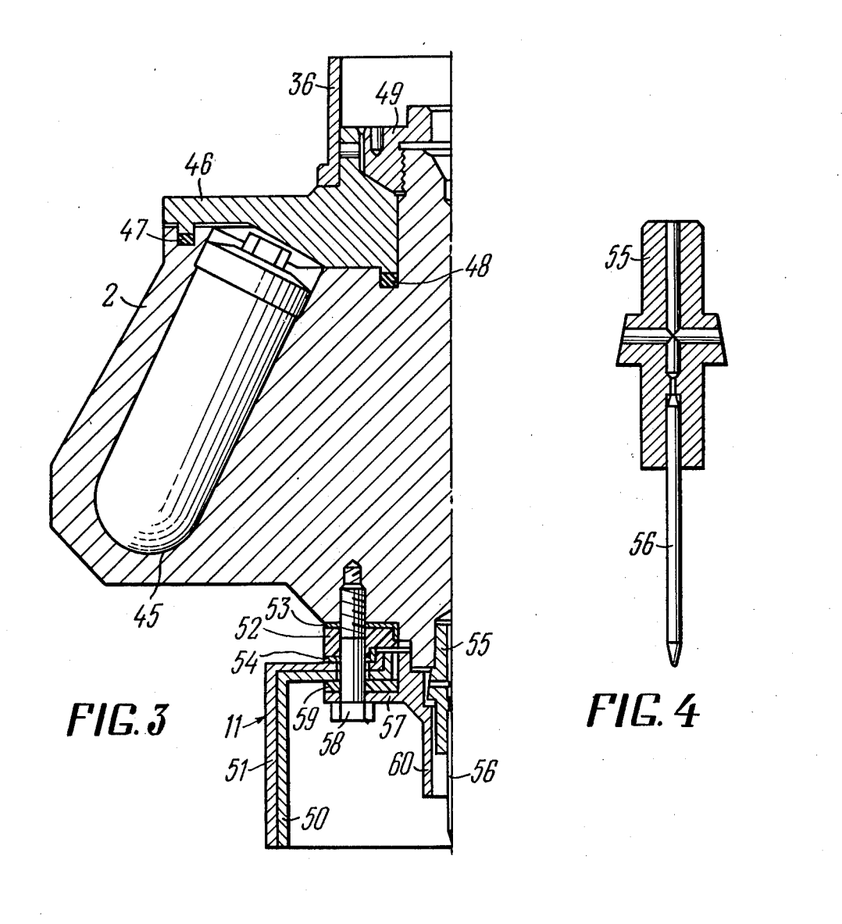
FIG. 3 is a cross-sectional view of the centrifuge rotor together with the armature of the magnetic suspension and the electric motor armature.
FIG. 4 is a cross-sectional view of the rotor support spindle.

The rotor 2 is a heavy monolythic part with holes 45 for test tubes with the preparations disposed equidistantly along the rotor circumference (FIG. 3). The axes of the holes 45 are at an angle to the axis of the rotor 2. This angle is selected so as to ensure gravity settling of the preparation in the test tube. The holes 45 in the rotor are disposed under a common cover 46 provided with sealing rings 47 and 48. The cover 46 is clamped to the rotor 2 by a special nut 49. An axial hole provided in the upper part (in the drawing) of the rotor 2 partly accommodates the thermistor 30 which also passes through the hole in the nut 49.

The rotor 2 and the cover 46 are manufactured from a high-strength aluminium alloy and their surface is oxidized black. The armature 36 of the magnetic suspension 33 is fixedly secured to the cover 46 of the rotor 2.

The armature 11 of the electric motor 4 is fixedly secured to the lower part (in the drawing) of the rotor 2. According to the invention the armature 11 is made in the form of a two-layer sleeve wherein one layer 50, in the given case the inner layer, is made from a ferromagntic material, such as steel, and the other layer 51 is made from a non-magnetic electrically conductive material, such as aluminium alloy. A heat insulator 52 interposed between the armature 11 and the rotor 2 is made from a material having a low heat conductivity such as glass-fibre reinforced plastic and is provided with metal strips 53 and 54.

The bottom of the rotor 2 has a cylindrical axial hole wherein a mandrel 55 with a hole is press-fitted, with a flexible support spindle 56 of the centrifuge rotor 2 being press-fitted in the hole of the mandrel. The flexible support spindle 56 (FIG. 4) has a conical end with a rounded tip. The armature 11 and the heat insulator 52 are mounted on the rotor 2 by means of a flange 57 and bolts 58 (FIG. 3). Another heat insulator 59 is interposed between the flange 57 and the armature 11.

The flange 57 has a cylindrical projection 60 adjacent to the flange hole, said projection being used to limit oscillations of the rotor 2 during its rotation and to hold the rotor 2 in a vertical position when it becomes unstable.

Figure 5:
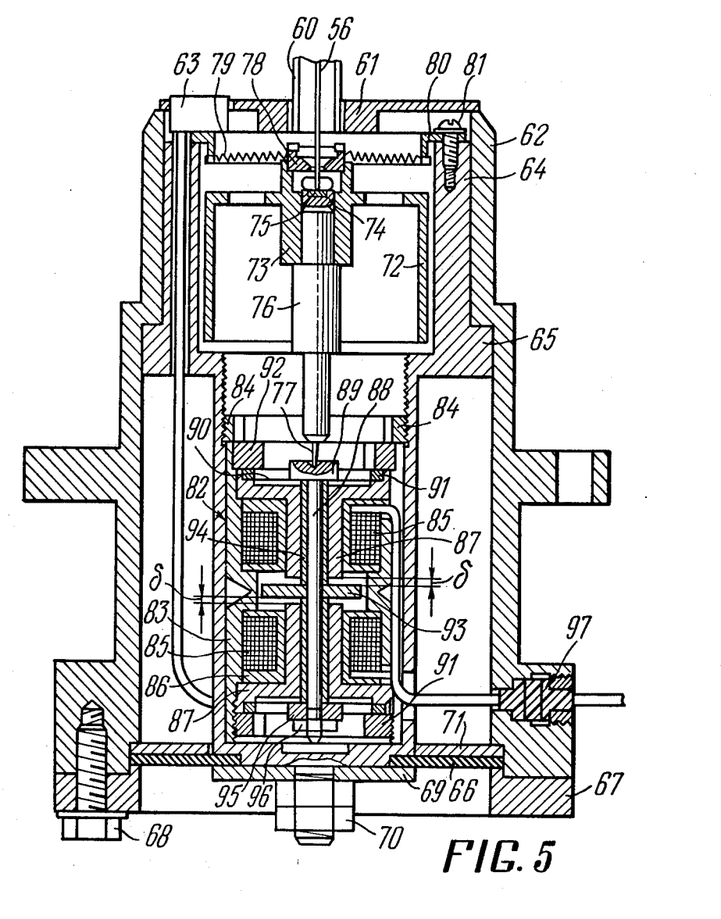
FIG. 5 is a cross-sectional view of the rotor support.

The cylindrical projection 60 is accommodated in the hole of a limiting disc 61 mounted in the rotor support 6 (FIG. 5).

The support 6 comprises a fixed sleeve 62 (FIG. 5) secured to the lower plate 15 of the centrifuge housing 1. Mounted on the upper side (in the drawing) of the sleeve 62 is said limiting disc 61 and a tacho-generator 63 used for measuring the speed of the rotor 2. The sleeve 62 of the support 6 houses a movable sleeve 64 which is installed so that it is able to move along the vertical axis of the support 6. The sleeve 64 has a flange 65 made integral with the sleeve and used to limit the sleeve displacement, while the inner surface of the sleeve 62 has a recess against which the flange 65 is thrust. The sleeve 62 is connected to the movable sleeve 64 by means of an elastic strip 66, one end of which is clamped between the lower butt end (in the drawing) of the sleeve 62 and a flange 67 by bolts 68, and the other end, between the lower butt end of the sleeve 64 and a washer 69, which is placed on a tail piece provided in the lower part of the sleeve 64 and attached by nuts 70.

The strip 66 is in contact with a limiting disc 71 the edge of which is clamped together with the strip 66 between the butt of the sleeve 62 and the flange 67. The limiting disc 71 prevents the strip 66 from being drawn inside the sleeve 62 of the support when the centrifuge housing 1 is being evacuated. The size and, consequently, rigidity of the strip 66 are selected depending on the weight of the rotor 2.

Mounted in the upper part (in the drawing) of the sleeve 64 is a sleeve 72 with its bottom facing upward. A central hole made in the bottom of the sleeve 72 receives a bushing 73 made integral with the sleeve, and a mandrel 74 with a step bearing 75 is press-fitted in the bushing hole approximately halfway along the bushing height. The step bearing 75 is made from a wear-resistant material and has a central spherical hole which receives the end of the flexible support spindle 56.

Inserted in the hole of the bush 73 from below is the end of a post 76 which is made in the form of a stepped cylinder; the shoulder thereof being thrust against the lower end (in the drawing) of the bush 73. A needle 77 is secured in the middle of the lower butt end of the post 76.

To center the step bearing 75 a cylindrical insert 78 with a central hole is mounted in the hole of the bush 73 at its upper end, the diameter of the insert hole being somewhat larger than the diameter of the flexible spindle 56. At the top the hole in the insert 78 is tapered so as to guide the flexible spindle 56 when the rotor 2 is being mounted. Connected at the outside of the insert 78 are springs 79 which are disposed equidistantly along the circumference in the radial direction, the free ends of the springs being attached in a ring 80 which is mounted on the upper side of the sleeve 64 by means of screws 81.

A pressure pick-up 82 mounted in a case 83 is disposed in the lower part (in the drawing) of the sleeve 61. The pressure pick-up is a cylinder freely mounted in the case 64 and secured by means of a ring 84. Coils 85 each of which is wound on a former 86 are disposed within the case 83 one above another. Each coil 85 has a core 87 made from a soft magnetic material. Each core 87 is provided with a support disc which is accommodated in a groove made on the inner surface of the case 83 so that one of the support discs is adjacent to the upper end of the top coil 85 and the other, to the lower end of the lower coil 85. A hole is made along the axis of the two cores 87 through which a bar 88 is passed. The bar 88 terminates in a toe 89 made integral with the bar, with the needle 77 of the post 76 resting on the toe. Located under the toe 89 is a diaphragm 90 which is in contact with the toe and whose edge is clamped between the support disc of the core 87 of the upper coil 85 and a washer 91 mounted in a groove made in the support disc of the core 87 and clamped by a washer 92 mounted in the case 83. The end of the bar 88 passes through a hole made in a similar diaphragm 90 which adjoins from below the support disc of the core 87 of the lower coil 85 and is secured in the same way as the upper diaphragm 90. A ferromagnetic disc 93 is secured to the bar 88 approximately halfway between its ends. The disc 93 is secured by means of distance bushings 94 placed on the bar 88. The upper diaphragm 90 is clamped between one of the distance bushings 94 and the toe 89 and the lower diaphragm 90, between the second distance bushing 94 and a washer 95 with a nut 96 mounted on the lower free end of the bar 88.

The ferromagnetic disc 93 is mounted on the bar 88 in such a way that a gap "S" is provided between the disc and the end of each core 87, the size of the gap being selected depending on the pressure exerted by the rotor 2 on the step bearing 75.

The leads of the coil 85 pass through the holes made in the walls of the sleeves 62 and 64 of the support 6. The holes in the sleeve 62 contain vacuum seals 97 for the leads. The same holes of the sleeve 62 accommodate the leads of the tacho-generator 63.

The space inside the sleeve 64 above the upper diaphragm 90 is filled with oil to a level slightly above the step bearing 75. The oil is intended to lubricate the rubbing surfaces of the flexible spindle 56 and the step bearing 75 and to damp oscillations of the rotor 2 during operation of the centrifuge.

In one embodiment of the invention the rotor 2 has a number of blades 98 (FIG. 6) which are disposed equidistantly along the circumference and, in the given case, are made integral with the rotor. Each blade 98 has a radial slot 99 for a vessel 100 containing the preparation. The vessel 100 (FIG. 7) is so mounted in the slot 99 of the blade 98 that it can turn on elastic axles 101 one end of each axle being press-fitted in a bushing 102 which is fitted in a hole in the blade 98, the other end being accommodated in a slot made in a boss 103 on the wall of the vessel 100. In this way the bushings 102 with the axles 101 which are located along a line perpendicular to the axis of the vessel 100 form an elastic suspension for the vessel. The bosses 103 on the walls of the vessel 100 are located above the centre of gravity of the vessel. The rotor 2 of such construction is used wherever the preparation being centrifuged must be kept from mixing while the rotor 2 is being braked and after it comes to a stop.

Figure 8:
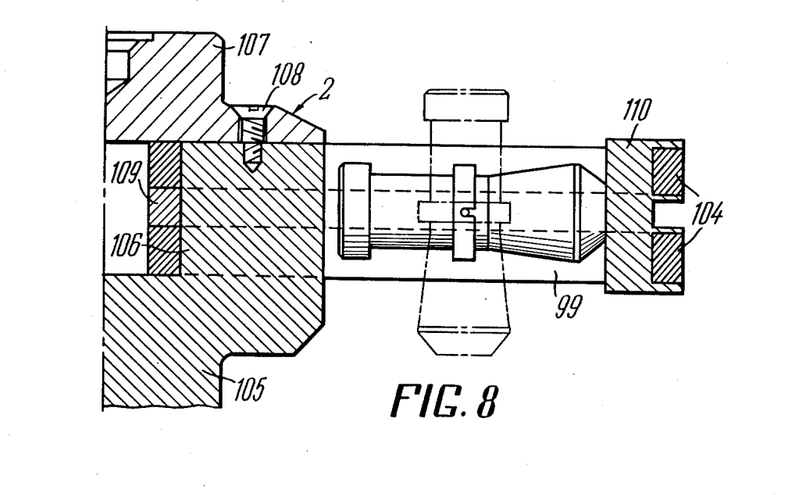
FIG. 8 is a view showing axial vertical section of the centrifuge rotor with one embodiment of the rotor blade.

FIG. 8 shows the rotor 2 with blades 104 made from an anisotropic material, in the given case, glass-fibre reinforced plastic, which has a maximum strength in the direction of the radius of the rotor 2.

Each blade 104 of such construction is made by winding many layers of continuous glass thread on a mandrel whose shape corresponds to the shape of the slot in the blade 104. The threads are held together by an epoxy binder.

The blades 104 are mounted on projections 106 (FIG. 9) provided in a central part 105 of the rotor 2 and are secured to the rotor 2 by means of a cover 107 with screws 108 which are driven into the holes in the projections 106.

Figure 9:
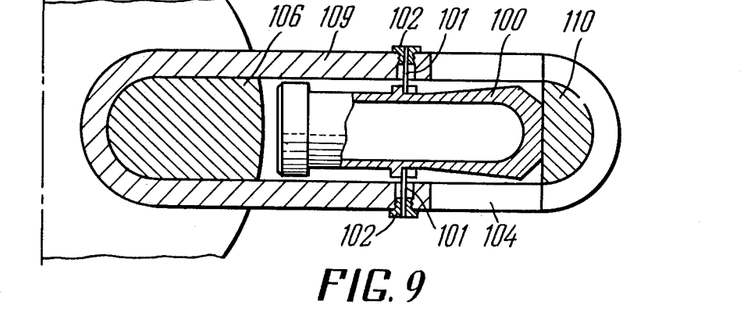
FIG. 9 is a sectional view taken on line IX—IX of FIG. 8.

The elastic suspension of the vessel 100 is designed in the same way as the one described above. For attachment of the elastic suspension for the vessel 100 the blade has a metal clamp 109 with the holes for the bushes 102, said clamp being located approximately halfway along the length of the blade 104 and embracing the projection 106.

Mounted at the end of the blade 104 is an insert 110 which serves as a support for the vessel 100 during rotation of the rotor 2.

The construction of the vessel 100 for the preparation is such that its walls increase in thickness uniformly towards its bottom to ensure the required strength of the vessel 100 and reduce its weight.

In this embodiment of the invention the armature 36 of the magnetic suspension 3, the armature 11 of the electric motor 4 and the support spindle 56 are attached to the rotor 2 in the same way as was described above.

Prior to use the rotor 2, together with the vessels holding the preparation and with the cover 46, is mounted in the centrifuge housing 1. The flexible spindle 56 of the rotor 2 rests against the step bearing 75 so that the weight of the rotor 2 is transmitted from the step bearing 75 to its mandrel 74 and to the bush 73 wherein the post 76 is press-fitted. The post 76 in its turn transmits the weight of the rotor 2 through the needle 77 to the toe 89 and the bar 88. From the toe 89 and the bar 88 the resultant force is imparted to the diaphragms 90 and then through the cores 87 of the coils 85 to the case 83 of the pressure pick-up 82 and, therefrom, to the movable sleeve 65 of the support 6. As a result of the force produced by the weight of the rotor 2 the sleeve 64 moves down until the rotor 2 touches the horizontal surface of the limiting disc 61. As the casing 64 moves down the elastic strip 66 bends, the rigidity of the strip being selected such that the pressure exerted on the step bearing 75 when the strip 66 is bent does not exceed a predetermined value, in the given case, 1 kg.

After the rotor 2 has been installed, the magnetic suspension 3 together with the flange 24 is mounted in the housing 1 and secured in the sleeve 22 at a definite level corresponding to the type of the rotor 2. This level is adjusted by selection of the rings 23 mounted in the wall of the sleeve 22.

Then the cover 21 of the housing 1 is closed by moving it along the guides 20.

Next the evacuation system is turned on to evacuate the space inside the centrifuge housing 1 to a pressure of about $10^{-3} - 10^{-4}$ mm Hg. At such time the cover 21 is caused by atmospheric pressure to be pressed against the upper plate 16 of the housing 1. Simultaneously with the evacuation of the housing 1 a temperature regulation system is turned on, this system including the temperature-regulating shell 8 which surrounds the rotor 2. While the centrifuge is running, the air evacuation and the temperature regulation systems operate continuously to maintain the required pressure and temperature within the housing 1. As the pressure within the housing 1 drops, atmospheric pressure acting on the elastic strip 66 and on the butt end of the movable sleeve 64 of the support 6 causes the movable sleeve 64 to move upwards until its flange 65 is thrust against a recess in the inner surface of the sleeve 62 of the support 6. At this time the rotor 2 also moves upwards and is supported only by the flexible spindle 56 resting on the step bearing 75. As the rotor 2 goes up, the armature 36 of the magnetic suspension 3 secured to the rotor approaches the lower side of the magnetic support 27. When the rotor 2 stops, a gap still separates the armature 36 and the magnetic support 27; the size of the gap being such that the magnetic suspension 3 with the permanent magnet 26 produces a lift at which the pressure exerted by the support spindle 56 of the rotor 2 of the step bearing 75 is about 1 kg. The size of the gap between the magnetic support 27 and the armature 36 also determines the horizontal rigidity of the magnetic coupling between them.

The thermistor 30 is mounted together with the magnetic suspension 3. One end of the thermistor enters a hole in the rotor 2. The thermistor 30 is used for continuous non-contact measurement of the temperature of the rotor 2 and for automatic control of the temperature regulation system. When the required rarefaction within the housing 1 and the required temperature of the rotor 2 have been attained, the electric motor 4 of the centrifuge is started. The electric motor 4 is connected to a power supply furnishing an A.C. voltage of adjustable frequency. The winding of the stator 12 produces a revolving magnetic field in which the armature 11 of the electric motor 4 is located, the motor being fixedly secured in the lower part of the rotor 2. The interaction between the magnetic field of the stator 12 and the armature 11 produces a torque which begins to rotate the armature 11 and the rotor 2 connected to the armature. During rotation of the armature 11 its internal ferromagnetic layer 50 serves as a magnetic circuit of the electric motor 4 and produces a hysteresis moment, while Foucault currents appear in the outer layer 51 made from a non-magnetic electrically conductive material, such as an aluminium alloy; the interaction between the Foucault currents and the magnetic field of the stator 12 results in the production of an asynchronous torque. The amount of magnitude of the asynchronous torque is determined by the time during which the centrifuge rotor 2 is accelerated to the required speed. The geometrical size of the armature 11, the thickness of its component layers and the material of the layers are selected depending on the required magnitude of the asynchronous torque, with due consideration for the armature strength. The fact that the armature 11 is designed as a sleeve made it possible to reduce the armature weight and thus facilitate the dynamic stability of the centrifuge rotor 2. With such shape of the armature 11, its attraction to the stator 2 does not increase the pressure exerted by the rotor 2 against the support 6. Because the magnitude of asynchronous torque exceeds by several times the hysteresis moment, the armature 11 together with the rotor 2 can be accelerated to a speed of 30,000 – 75,000 r.p.m., depending on the rotor type, within a comparatively short period of time — 20-25 min. During starting of the electric motor 4 the frequency of the supply current is adjusted so that the difference between the speed of the magnetic field of the stator 12 and that of the armature 11 of the electric motor 4 is constant. This difference is 25 – 50 Hz, being sufficiently high to obtain the required asynchronous torque with a comparatively small amount of heat produced by the armature 11 during operation of the electric motor 4.

When the required speed of the rotor 2 is attained, the rotation speed of the armature 11 becomes equal to the speed at which the magnetic field of the stator 12 revolves and is maintained constant throughout operation of the centrifuge due to the hysteresis moment produced by interaction between the material of the internal ferromagnetic layer of the armature 11 and the magnetic field of the stator 12. Since in this type of centrifuge operation the power consumed for rotation of the rotor 2 is as low as 3 – 5 W, the supply current of the stator 12 of the electric motor 4 is reduced to a fraction of its former value. The required speed of the rotor 2 is maintained by stabilizing the frequency of the supply current. The speed of the rotor 2 is continuously measured by means of the inductive tacho-generator 63 mounted on the movable sleeve 64 of the support 6. The inductors of the generator 4 are the heads of the bolts 58 passing above it. The rotor 2 can continuously rotate for as long as several thousand hours. Oscillations of the rotor 2 which appear during its acceleration at critical frequencies and the oscillations caused by the attraction of the armature 11 to the stator 12 or by any other reasons are transmitted through the flexible support spindle 56 and the step bearing 75 to the sleeve 72 and are damped in the oil bath in which this sleeve is mounted.

The tension of the centering springs 79 is selected such that after the oscillations are damped the springs return the insert 78, the step bearing and the sleeve 72 connected to the insert to the initial central position.

The amplitude of the oscillations of the rotor 2 caused by comparatively strong accidental disturbances is limited by the ring 38 which in such cases comes in contact with the armature 36 of the magnetic suspension 3, and by the bush 60 accommodated in the hole of the disc 61.

The pressure exerted by the support spindle 56 on the step bearing during operation of the centrifuge is continuously sensed by the pressure pick-up 82 which operates as follows. The pressure exerted by the spindle 56 on the step bearing 75 is transmitted through the post 76, the needle 77 and the toe 89 to the bar 88 connected to the diaphragms 90 and the ferromagnetic disc 93. The diaphragms bend and move the bar with the disc 93 up and down depending on the variation of pressure applied to the step bearing 75 and, in doing this vary the gap "δ" between the ferromagnetic disc 93 and the cores 87 of the coils 85. This causes changes in the inductive reactance of the coils which are sensed by a measuring system. The measurement of pressure on the step bearing 75 makes it possible to check for correct initial assembly of the centrifuge and its condition during operation. In the case of the rotor 2 shown in FIG. 6, this rotor is mounted in the centrifuge and accelerated in the same way as was described above.

Figure 6:
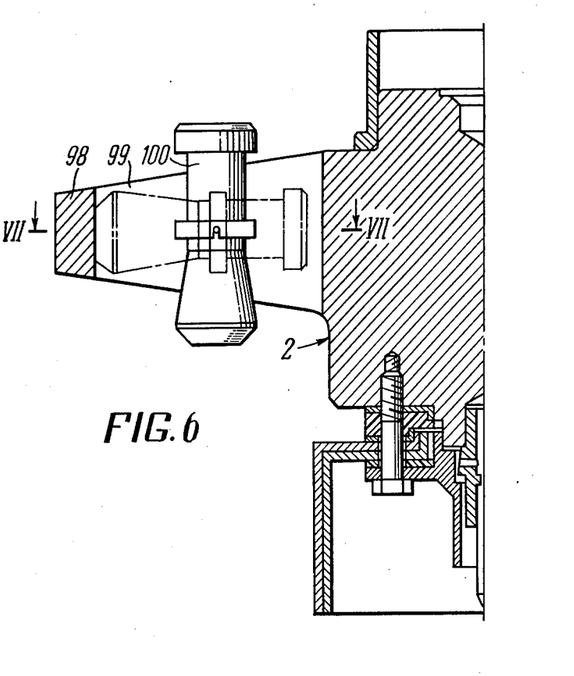
FIG. 6 is a view showing axial vertical section of one embodiment of the centrifuge rotor together with the armature of the magnetic suspension and the electric motor armature.
Figure 7:
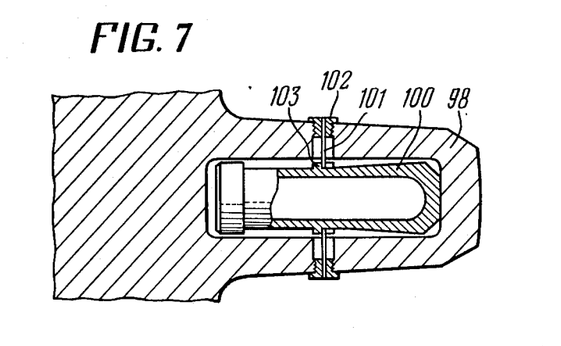
FIG. 7 is a sectional view taken on line VII—VII of FIG. 6.

When the rotor 2 is mounted in the centrifuge the vessels 100, mounted in the slots 99 of the blades 98 of the rotor 2 and held by the axles 101, take up a vertical position.

While the rotor 2 is being accelerated, the vessels 100 gradually move away from a vertical position and turning on the axles 101 take up a horizontal position. As the speed of the rotor 2 is increased still more, the vessel 100 overcomes the resilience of the axle 101 and its bottom is thrust against the base of the slot 99 of the blade 98 and remains in this position throughout the time during which the centrifuge is operating.

In the case of the rotor 2 with the blades 104 shown in FIG. 9, the vessel 100, after it takes up a horizontal position, is thrust with its bottom against the insert 110 mounted in the base of the slot 99 of the blade 104.

When the rotor 2 is braked the current of the stator 12 is increased to the starting value. The frequency of the supply current is gradually decreased to, say, 100 Hz, maintaining the difference between the rpm's of the magnetic field of the stator 12 and that of the armature 11 of the electric motor 4 constant and equal to 25-50 Hz.

For completely stopping the rotor 2 the stator 12 is connected to a D.C. source. In breaking, as in starting, the electric motor 4 operates as an asynchronous machine.

After the rotor 2 comes to a full stop, the magnetic system 3 holds it in the same position as during operation of the centrifuge.

To extract the rotor 2 from the housing 1 air is let into the housing to equalize the pressure and the temperature regulation system is turned off. When the pressure inside the centrifuge housing 1 rises, the movable sleeve 64 of the support 6 moves downward, stretching the elastic strip 66, and the rotor 2 rests on the limiting disc 61. After this the cover 21 is moved aside on the guides 20, the flange 24 together with the magnetic suspension 3 is taken out and the rotor 2 is extracted.

In the case of the rotors 2 shown in FIGS. 6 and 9, the axles 101 gradually straighten out moving the bottom of the vessel 100 from the base of the slot 99 in the blade 98 or 104, after which the vessel 100 gradually returns to the vertical position.

The centrifuge is stopped and the rotor 2 is extracted from the centrifuge in the same way as was described above.

What is claimed is:

1. A preparation-making ultra centrifuge comprising: an evacuated housing which contains a vertically installed rotor; a temperature-regulating shell which surrounds said rotor, said rotor being adapted for accommodation of vessels containing preparation; a magnetic suspension disposed within said evacuated housing above and coaxially with said rotor; a drive of said rotor disposed under and coaxially therewith; a support of said rotor disposed under and coaxially therewith; said drive including an electric motor with an armature thereof being made in the form of a sleeve fixedly secured to said rotor and wherein said magnetic suspension includes an annular permanent magnet with a magnetic support.

2. The preparation-making ultracentrifuge as claimed in claim 1, wherein the armature of the electric motor is formed by two sleeves inserted into each other, one of which is made from a ferro-magnetic material and the other from a non-magnetic electrically conductive material having a specific strength of not less than 13Km.

3. The preparation-making ultracentrifuge as claimed in claim 1, wherein a stator of the electric motor is disposed within the evacuated housing of the ultracentrifuge and is fixedly secured to the temperature-regulating shell.

4. The preparation-making ultracentrifuge as claimed in claim 3, wherein a heat insulator is interposed between and fixedly secured to the electric motor armature and the ultracentrifuge motor.

5. The preparation-making ultracentrifuge as claimed in claim 1 wherein the magnetic support of the magnetic suspension includes a bushing disposed concentrically with the magnet, with a support member adjoining the bushing perpendicularly to its axis so that a gap is provided between said bushing and said magnet, the size of the gap and the bushing length being dependent on the required lifting pull of the magnetic suspension.

6. The preparation-making ultracentrifuge as claimed in claim 1, wherein the rotor has a plurality of blades disposed equidistantly along the circumference of the rotor and fixedly secured thereto, with a slot disposed in each blade along the radius of said rotor for accommodation of a cylindrical vessel containing preparation, said vessel mounted with axles in said slot so that said vessel can turn on the axles, said axles fixedly secured in the rotor perpendicularly to the axis of said vessel.

7. The preparation-making ultracentrifuge as claimed in claim 6, wherein each of the rotor blades is made from an anisotropic material which has a maximum strength in the direction of the radius of the rotor and is fixedly secured to the central part of said rotor.

8. The preparation centrifuge as claimed in claim 7 wherein the vessel for preparation has walls, the thickness of which uniformly increases towards its bottom.

* * * * *